United States Patent
Metzner et al.

[15] 3,648,617
[45] Mar. 14, 1972

[54] RESILIENT GRIPPING RAILWAY TRACTION SYSTEM

[72] Inventors: Robert Metzner, Beverly Hills; Stanley A. Dashew; Justin A. Varney, both of Los Angeles, all of Calif.

[73] Assignee: Security Pacific National Bank

[22] Filed: Aug. 11, 1969

[21] Appl. No.: 848,884

[52] U.S. Cl. ............... 104/94, 104/87, 104/116, 104/119, 104/243, 104/245, 104/247, 105/29 R, 105/30, 105/73, 105/144, 105/153, 105/155, 238/134, 238/135
[51] Int. Cl. ............... B61b 3/02, B61b 13/02, B61b 13/04
[58] Field of Search .............. 104/87, 115, 116, 140, 247, 104/88, 94, 119, 243, 245; 105/30, 73, 144, 145, 151, 153, 29, 155; 238/134, 135

[56] References Cited

UNITED STATES PATENTS

| 11,827 | 10/1854 | Devlan | 238/134 |
|---|---|---|---|
| 22,376 | 12/1858 | Plinta | 238/135 |
| 892,586 | 7/1908 | Ferlin | 104/87 |
| 2,018,087 | 10/1935 | Plass | 105/153 |
| 2,997,003 | 8/1961 | Thompson | 105/151 X |
| 3,384,031 | 5/1968 | Dashew et al. | 104/140 X |
| 3,429,280 | 2/1969 | Dashew et al. | 105/30 X |
| 2,709,968 | 6/1955 | Cox | 105/30 X |
| 3,540,380 | 11/1970 | Tumpak et al. | 105/30 X |

Primary Examiner—Arthur L. La Point
Assistant Examiner—Howard Beltran
Attorney—Samuel Lindenbergh and Arthur Freilich

[57] ABSTRACT

Apparatus for use with a vehicle which runs along a track to increase the traction of the drive wheels so they do not slip when starting or climbing hills. One traction increasing apparatus includes an extra track member for increasing the distance between upper and lower track surfaces that support the drive wheels and lower wheels, respectively, of the vehicle.

5 Claims, 9 Drawing Figures

Patented March 14, 1972
3,648,617
2 Sheets-Sheet 1
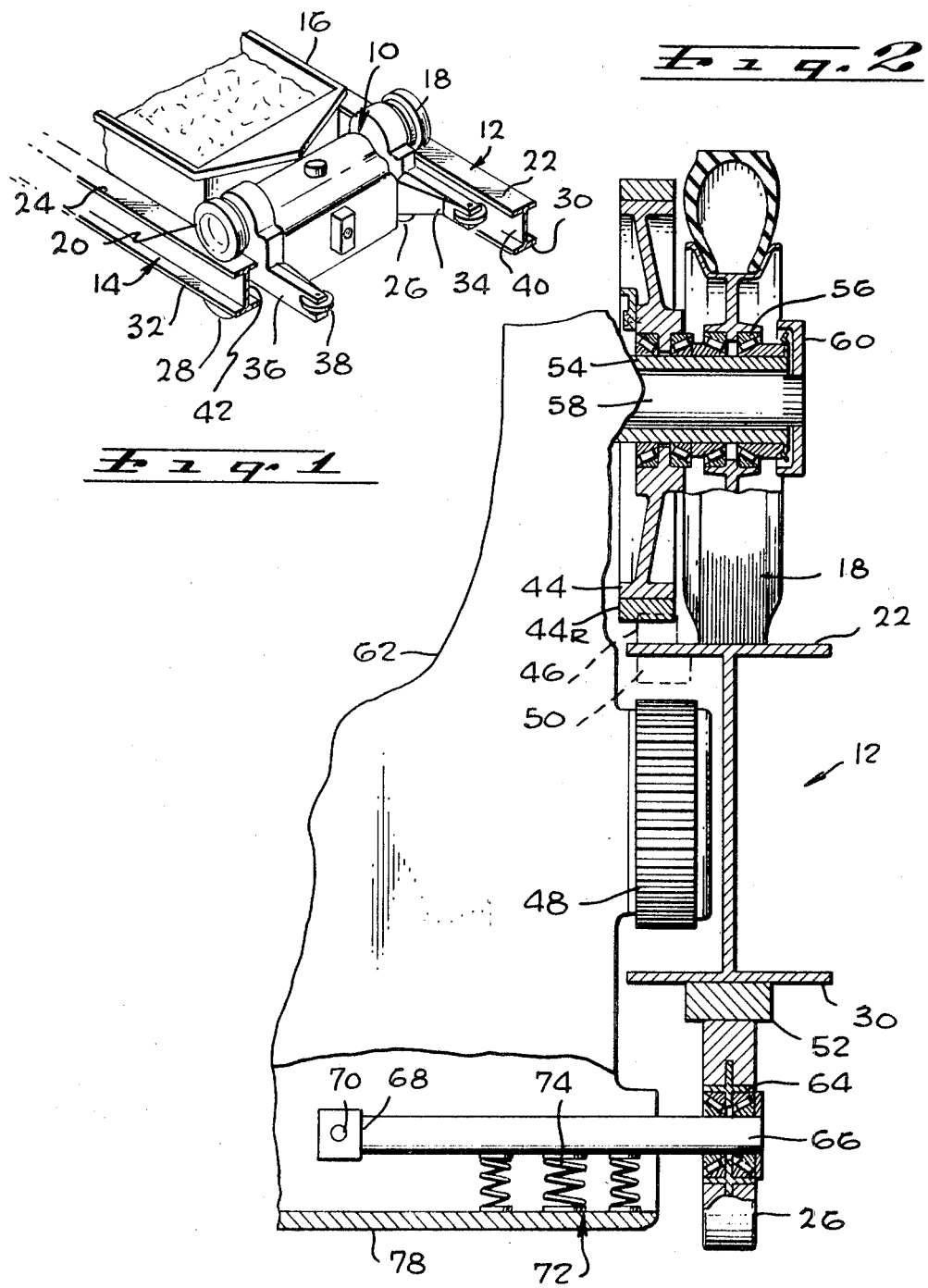
INVENTORS
ROBERT METZNER
STANLEY A. DASHEW
JUSTIN A. VARNEY
BY
Lindenberg & Freilich
ATTORNEYS Patented March 14, 1972
3,648,617
2 Sheets-Sheet 2
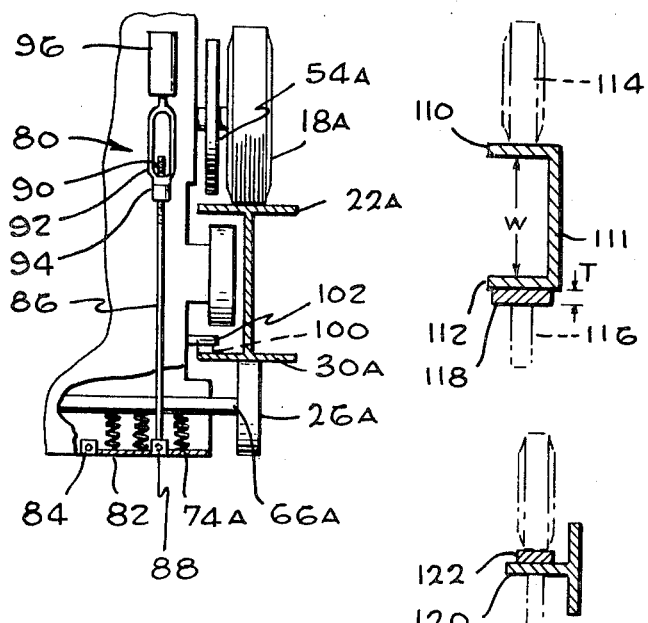
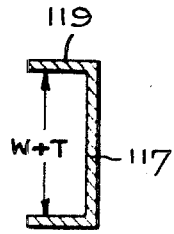
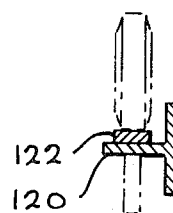
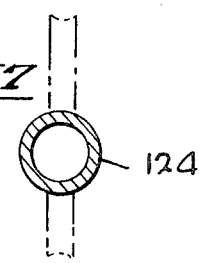
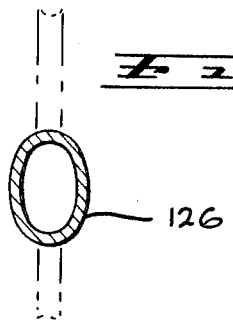
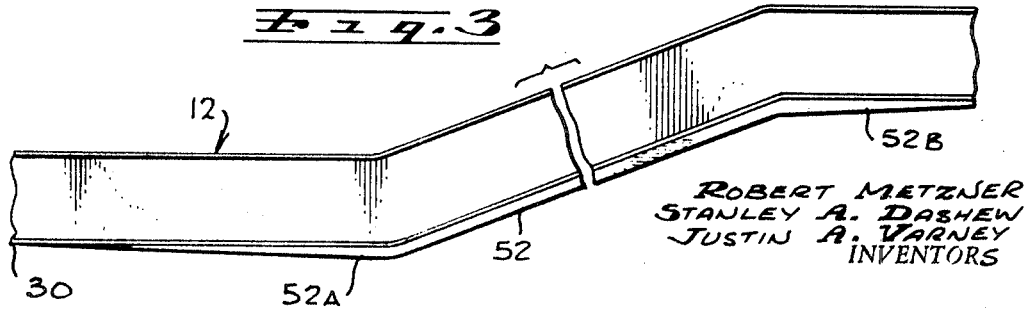
ROBERT METZNER
STANLEY A. DASHEW
JUSTIN A. VARNEY
INVENTORS
BY
Lindenberg & Freilich
ATTORNEYS

RESILIENT GRIPPING RAILWAY TRACTION SYSTEM

BACKGROUND OF THE INVENTION

1. Field of the Invention

This invention relates to transportation systems, and more particularly to apparatus for reducing or eliminating slippage of vehicle drive wheels.

2. Description of the Prior Art

A novel transportation system is described in U.S. Pat. No. 3,540,380 by Tumpak et al., entitled Articulated Railway Transportation System. As described in that application, the system can move flights of cars up even the steepest grades, by a pinion-type drive on the vehicle that engages a rack extending along the track at steep grades. While the rack and pinion drive provides very high traction, it is generally useful only at low speeds such as several miles per hour. The flights of cars generally run on pneumatic tires which are driven to move the vehicles over level or only slightly inclined track areas at high speeds such as 40 m.p.h. Apparatus which could increase the traction of the tires when required, would enable starting and movement over steeper inclines at high speeds, and minimize the use of the special racks for pinion drive. Furthermore, traction increasing apparatus could promote safety by preventing skidding during harder braking.

OBJECTS AND SUMMARY OF THE INVENTION

An object of the present invention is to provide apparatus for use with a transportation system for selectively varying the traction of vehicle drive wheels.

Another object is to provide apparatus for use in a transportation system to increase the traction of high speed drive wheels.

In accordance with the invention, apparatus is provided for increasing the traction between a vehicle drive wheel and the track along which the vehicle runs. In one embodiment of the invention, a vehicle is provided that runs along an I-beam track, with a drive wheel that runs on the upper flange to support the weight of the vehicle and drive it, and with a lower idler wheel that runs along the bottom flange. An additional track member is added, or a different size track is employed, at regions along the track where increased traction is required, to tend to spread apart the drive and lower idler wheels. This increases the pressure of the drive wheels on the track and therefore increases the tractive effort which the drive wheels can apply without slipping. The additional traction is obtained at regions such as on relatively steep inclines and at locations immediately following a loading station, without an elaborate control system. In another embodiment of the invention, a clamping mechanism is provided on the vehicle to controllably draw the drive and lower idler wheels together so they bear more heavily on the track even though the distance between the upper and lower flanges of the track does not vary.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a transportation system constructed in accordance with the invention;

FIG. 2 is a partial sectional front view of the system of FIG. 1;

FIG. 3 is a side elevation view of the system of FIG. 1, at a region of steep incline;

FIG. 4 is a partial sectional front view of a transportation system constructed in accordance with another embodiment of the invention; and FIGS. 5, 5A, 6, 7 and 7A are cross-sectional views of tracks constructed in accordance with other embodiments of the invention.

DESCRIPTION OF THE PREFERRED EMBODIMENTS

FIG. 1 illustrates a transportation system in which drive units 10 move along a track comprising I-beam rails 12, 14 pulling cars 16 loaded with ore or other goods, or passengers. The drive unit is generally supported by two drive or traction wheels 18, 20 which rest on the upper flanges 22, 24 of the I-beam rails. A pair of lower idler wheels 26, 28 are positioned below the tracks for running along the lower flanges 30, 32 of the rails. The idler wheels support the vehicle when it is turned over as in unloading bulk goods, and hold the vehicle securely to the track when moving up very steep grades when the vehicle is driven by a pinion that engages a rack on the track. The unit also has a pair of outriggers 34, 36 which have guide wheels 38. The guide wheels 38 bear against the webs 40, 42 of the I-beam rails.

FIG. 2 illustrates one side of the drive unit and track, the other side of the unit being constructed in the same manner. The drive unit includes an idling lifting wheel 44 whose rim 44R is normally above the level of the upper I-beam flange 22. However, at regions where extremely high traction or constant slow speed is required, such as in climbing very steep grades or during loading and unloading, the vehicle may rest on the lifting wheels 44. In those regions, a lifting track member, shown in phantom lines at 46, is attached to the track so the vehicle is lifted up on the wheel 44. This lifts the traction wheel 18 off the track and engages a pinion drive 48 with a rack, shown in phantom lines at 50, mounted on the track. The vehicle is then driven by the pinion and is supported on the idling lifting wheel (unless it is upside down, in which case it is supported on the lower idler wheel 26).

While the pinion drive is useful for very high traction, it is generally limited to a low speed such as a few miles per hour. During most of its travel, the vehicle runs on the traction wheels 18 at a much higher speed such as 40 m.p.h. In many situations it is desirable to provide for moderately high traction at high speeds. While the traction wheels have substantial traction, even greater traction on the track would be desirable in areas of moderately steep slopes and where the vehicles must accelerate from a few miles per hour to a high speed with a full load. Increased traction would also enable better braking to slow the vehicle when it is running on the traction wheels.

In accordance with the invention, increased traction is obtained by providing a traction rail 52 on one of the flanges, such as the bottom flange 30 as illustrated in FIG. 2. The traction rail increases the separation of the traction wheel 18 and lower idler wheel 26, which makes both of them bear more heavily on the upper and lower flanges 22, 30, respectively. The greater force of the traction wheel on the upper flange allows it to propel the vehicle with greater force, to rapidly accelerate it with a heavy load, to move it up moderately steep inclines, and to allow for engine braking when moving down moderately steep inclines.

The increase in traction obtainable with the traction rail 52 depends upon appropriate suspension of the lower idler wheel 26 so that it resists, with a large spring force, being shifted down relative to the traction wheel. The traction wheel 18 is mounted on a stationary support shaft 54 by roller bearings 56, and is driven by a separate motor-driven drive shaft 58 that extends through the support shaft and is connected to the traction wheel by a coupling 60. The support shaft 54 is rigidly fixed to the frame 62 of the vehicle, so the traction wheel is rigidly mounted. The lower idler wheel 26 is mounted by roller bearings 64 on the outer end of a support shaft 66. The inner end 68 of the shaft is pivotally mounted on the frame by a bearing 70. A spring support assembly 72 biases the shaft upwardly to urge the idler wheel 26 toward the rail.

The spring support assembly includes springs 74 which extend between a lower frame section 78 and mounts on the shaft 66. The springs 74 press the shaft upwardly to urge the idler wheel 26 to a position spaced below the lower flange 30, so it normally does not contact the flange. However, during low-speed operation, when the lifting wheel 44 rides on a lifting rail 46 to raise the traction wheel 18 off the flange, the vehicle frame is raised until the idler wheel 26 barely contacts the lower flange 30. The springs 74 are then compressed slightly so that any further lifting of the vehicle frame will require compression of the springs. If the low-speed operation occurs when the vehicle is upside down for unloading, most of the weight of the vehicle will be taken by the idler wheel 26 rather than by the pinion 48 which lies on the rack 50.

In order to increase traction of the traction wheel 18 on the flange, a section of traction rail 52 is provided. The traction rail 52 is thick enough to result in appreciable compression of the springs 74, which causes the vehicle frame to be biased down and thereby increases the downward force on the traction wheel 18. The amount of traction increase depends upon the thickness of the rail 52 and the spring constant of the spring 74 (also upon any preloading of the springs). For conditions where only a small increase in traction may be required, as for a small incline, a rail 52 may be provided which is thick enough to only sightly compress the springs 74. Where a greater increase in traction is required, a thicker traction rail is provided. The traction rail has a gradually decreasing thickness at its ends to prevent shock when it first begins to depress the idler wheel and when it ceases to do so. It should be noted that the traction rail 52 can be placed on the upper flange 22 under the path of the traction wheel, instead of on the lower flange, to achieve the same increase in traction. Also, the vehicle can be constructed so that driving and/or braking power can be transmitted through the lower wheels. Furthermore, means can be provided to limit the maximum driving or braking torque to prevent skidding.

The use of a traction rail allows for an increase in traction at selected zones along the transportation system, without necessitating the use of complicated control and activating apparatus. This increases the reliability of the traction increasing apparatus, and makes it economical in system where there are only a limited number of short regions which require increased drive wheel traction so that only a small quantity of traction rail is required.

FIG. 3 illustrates one track 12 at a region of moderately steep incline. The traction rail 52 is attached to the lower flange 30 along the length of the inclined track region. Such attachment can be performed by welding, bolts, or the like. Tapered traction rail portions 52A and 52B are provided at either end of the incline to provide a gradual application of force to the lower idling wheels and the drive wheels of the vehicle. It should be understood that the extra force on the vehicle drive wheels should be employed only at those regions where increased traction is necessary, since the increased load causes much faster wear on the tires of the vehicle.

FIG. 4 illustrates another embodiment of the invention in which the force of the traction wheel 18A on the flange 22A is increased by a clamping mechanism 80 that draws the traction and lower idler wheels together. The traction and idler wheels are supported in the same manner as those of the vehicle described above, except that a frame portion 82 on which the springs 74A rest is pivotally mounted at 84 on the rest of the frame. The clamping mechanism includes a rod 86 with a lower end 88 pivotally connected to the frame portion 82 and a threaded upper end 90. A nut 92 that engages the upper end of a rod, is rotatably supported on a thrust bearing 94 that is fixed to the vehicle frame at a position near the support shaft 54A on which the traction wheel is mounted. When the nut 92 is rotated in a forward direction, it pulls up on the rod 86, the upward force being transmitted to frame portion 82, lower idler wheel support shaft 66A, and idler wheel 26A. The upward force of the idler wheel on the track flange 30A causes the traction wheel to push down harder on the upper flange 22A to increase its traction thereon.

Rotation of the nut 92 is performed by a gear head motor 96 with a hollow lower shaft portion that can receive the upper end of the rod as the rod moves up. When extra traction is needed, the motor is energized to turn in a forward direction until the rod 86 is turned tight enough to obtain the desired increase in traction. A limit switch (not shown) then automatically stops the motor. When increased traction is no longer needed, the motor turns in the reverse direction to allow the frame portion 82 to move down. Commencement of energization of the motor 96 can be accomplished in a number of ways, such as by a switch operating mechanism shown in phantom lines at 100 placed along the track at the beginning and end of steep inclines, and at other regions where increased traction is required. The switch operating mechanism 100 operates a switch 102 mounted on the vehicle that initiates the energization of the motor 96. The advantage in the use of the clamping mechanism of FIG. 4 over the apparatus of FIGS. 1–3 is the elimination of long lengths of traction rail, and the capacity to allow a human operator to apply increased traction at any time when the apparatus is under the control of a human operator. However, the system of FIG. 4 does employ additional moving parts in each vehicle, which adds to the expense of the vehicle.

FIGS. 5, 5A, 6, 7 and 7A illustrate additional embodiments of the invention, similar to the embodiment of FIGS. 1–3 wherein a traction rail is added at regions where increased traction is desired. FIG. 5 shows a C-shaped rail with flanges 110 and 112 extending between a vertical web 111 for supporting traction and idler wheels 114, 116 and with a traction rail 118 for spreading apart the wheels to increase traction at selected regions of the system. FIG. 5A illustrates a C-shaped rail 119 similar to that of FIG. 5, but wherein a longer web 117 is used at selective regions, instead of an additional track member. FIG. 6 illustrates a T-shaped rail with the leg of the T substantially horizontal to serve as a single flange 120, the flange having upper and lower surfaces for supporting traction and idler wheels, and a traction rail 122 fastened to the upper surface at selected regions. FIGS. 7 and 7A illustrate tubular rails 124 and 126, the rail 124 being circular and the rail 126 being oval to increase the separation of the upper and lower vehicle wheels at selected regions. The oval rail 126 has about the same radius of curvature at its upper and lower surfaces as the circular rail 124, to permit firm engagement with the upper and lower vehicle wheels.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A transportation system comprising:
    a track layout having parallel upwardly and downwardly facing track surfaces extending therealong, said track surfaces having a first separation along certain regions of the layout and having a second separation greater than said first separation along certain other regions; and
    a vehicle having a traction wheel for rollably supporting it on said upwardly facing track surface, and a second wheel for rollably engaging said downwardly facing track surface, a motor coupled to said traction wheel to drive it, and means for resiliently urging said second wheel upwardly with respect to said first wheel, said vehicle constructed to be driven along said track by said traction wheel when it engages said upwardly facing surface both along regions where said track surfaces have said first separation and where they have said second separation.

2. The transportation system described in claim 1 wherein:
    said regions where said track surfaces have said second separation include regions of steep but less than vertical incline, and said regions where said track surfaces have said first separation include regions immediately proceeding and following said regions of steep incline.

3. A transportation system comprising:
    a vehicle having a first wheel for rollably supporting the vehicle on an upwardly facing track surface, motor means connected to said first wheel to drive it, a second wheel for rolling along a downwardly facing track surface, and means for urging said second wheel upwardly with respect to said first wheel; and a track having upwardly and downwardly facing track surfaces for respectively engaging said first and second vehicle wheels, said track including a first inclined region preceded and followed by regions of lesser incline, and said track having a larger separation between said upwardly and downwardly facing track surfaces along said first inclined region than along said regions of lesser incline preceding and following it;

said vehicle constructed to be driven by said first wheel along said first inclined region as well as along said regions preceding and following it.

4. The transportation system described in claim 3 wherein:
said track includes a plurality of aligned beams of constant height extending along said first inclined region and said regions preceding and following it, and traction rails fastened to surface portions of said beams substantially only along said first inclined region and not along said regions preceding and following it, so that the surface portions of said beams define said track surfaces along said regions preceding and following said first inclined region while a surface of said traction rails defines one of said track surfaces along said first inclined region.

5. The transportation system described in claim 4 wherein:
said traction rails are tapered in thicknesses near opposite ends of said inclined region, to provide a gradual change of wheel separation.

* * * * *